United States Patent [19]

Joos

[11] Patent Number: 4,908,952

[45] Date of Patent: Mar. 20, 1990

[54] ALIGNMENT AND SUPPORT DEVICE FOR TILES HAVING REINFORCED GRIPPING AREA

[76] Inventor: Bob Joos, 760 E. 12000 South, Draper, Utah 84020

[21] Appl. No.: 382,350

[22] Filed: Jul. 20, 1989

[51] Int. Cl.$^4$ .............................................. G01B 5/16
[52] U.S. Cl. .................................................... 33/526
[58] Field of Search ................... 33/526, 527, DIG. 20

[56] References Cited

U.S. PATENT DOCUMENTS

| | | | |
|---|---|---|---|
| 2,930,135 | 3/1960 | Rodtz | 33/DIG. 20 |
| 3,010,213 | 11/1961 | Rodtz | 33/526 |
| 3,199,205 | 8/1965 | Halde et al. | 33/526 |
| 3,735,497 | 5/1973 | Boettcher | 33/526 |
| 4,793,068 | 12/1988 | Golkar | 33/526 |

OTHER PUBLICATIONS

"U Need 'Em . . . We've Got 'Em", VIC Industrial Corp., Knoxville, Tennessee, *Dimensional Stone*, Jun. 1989, p. 41.

*Primary Examiner*—William A. Cuchlinski, Jr.
*Assistant Examiner*—William C. Dowling
*Attorney, Agent, or Firm*—Thorpe, North & Western

[57] ABSTRACT

An alignment and support device for tiles having a generally wedge-shaped rectangular body which tapers from a rear edge to a front edge thereof. The rear edge of the device is reinforced by a generally U-shaped ridge which is coextensive with the rear edge and portions of the side edges thereof. The reinforcement ridge aids the user in gripping the device for placement and removal. Ridge members may also be included on the surface of the device extending from the reinforcement ridge to the front edge thereof for increasing the overall thickness and rigidity of the wedge so that it can be used for spacing larger tiles and/or marble slabs. In another embodiment of the device, the retaining ridge is simplified to extend along only the rear edge of the wedge. Such a modification allows the device to be used on smaller tiles where greater reinforcement is not required.

3 Claims, 2 Drawing Sheets 4,908,952

ALIGNMENT AND SUPPORT DEVICE FOR TILES HAVING REINFORCED GRIPPING AREA

BACKGROUND OF THE INVENTION

1. Field of the Invention

This invention relates to an alignment device. More particularly, this invention relates to a device useful for insuring level placement of a tile or row of tiles against a surface.

2. Background Information

In the construction of tile walls, floors and other surfaces, it is important to be able to correctly align tiles to insure their compliance with a predetermined pattern and their correct spacing from other tiles.

Prior to the present invention, the surface to which the tiles were to be placed was covered with an adhesive (the adhesive may be any polymer-type adhesive useful for holding ceramic tile, or may be a cement or mortar) and the rear face of the tile was placed in contact with the adhesive. The adhesive generally had the characteristics of being semifluid and slowly hardening, thereby allowing the tiles once placed thereagainst to be slightly adjusted to insure alignment with respect to adjacent tiles, and/or to a predetermined pattern, and the tiles were aligned by several different methods, such as by a level or leveling line, or a preinscribed pattern on the surface to be tiled, etc.

Because of the originally semifluid nature of the adhesive, and the need to use a previously aligned tile in the alignment of successive tiles, and because of the contour and orientation of the surfaces to be tiled, it has often been necessary to secure an aligned tile in place until the adhesive cures sufficiently to prevent further movement thereof.

The most common prior art device useful for holding tiles in place is a small piece of wood, such as a "toothpick" or the like. The tile is correctly aligned and then the toothpick or toothpicks are placed in between and adjacent tiles to hold them in place (and to support other tiles) while the adhesive cures. These toothpicks must be modified as they are used, either by taking them apart, bending them in half, stacking them on top of each other, etc., in order to fill the space between adjacent tiles and support them in such a manner that incidental forces cannot cause the tiles to move from their aligned position. This "toothpick" type of alignment device is very difficult and time-consuming to use, and does not consistently maintain the tile in its aligned position. Also, too large and heavy tiles such as marble slabs and the like cannot be aligned or supported with such small and relatively weak devices.

To improve the ability of the tile layer to correctly align, and to secure correctly aligned tiles in place, there is a need in the art for a device which cannot only quickly and easily force a tile into its correctly aligned position, but also thereafter hold the tile in a secure manner while the adhesive cures. There is also a need for such a device which can be easily removed from its location between adjacent tiles in such a manner that the tiles themselves are not dislodged or misaligned by the removal thereof. There is also a need to provide such devices with means to allow their removal by hand, thus avoiding the need of tools or other devices to be levered against the newly positioned tile in order to generate sufficient force for their removal. There is a further need to provide such a device which is of a size and strength to support and align even very large tiles such as marble slabs, etc.

SUMMARY OF THE INVENTION

It is an object of the invention to provide a device which can align and secure tiles until adhesive can cure sufficiently to hold the tiles in place.

It is another object of the invention to provide a device which can align and secure tiles in their aligned position while other tiles are aligned adjacent thereto.

It is another object of the invention to provide a device which can align and secure the alignment of a tile regardless of its size and weight, and which can be easily removed.

The above and other objects of the invention are realized in a specific illustrative embodiment of an alignment device which includes a generally wedge-shaped rectangular member having a reinforcement ridge extending above the thickest portion thereof. The reinforcement ridge also forming a gripping edge which facilitates placement and removal of the device.

In accordance with another aspect of the invention, the wedge area of the device may further include ridge members which extend from the thinnest portion of the wedge along the top surface thereof to meet with the reinforcing ridge. This embodiment of the invention allows for greater spacing between tiles, and greater strength for supporting larger tiles.

BRIEF DESCRIPTION OF THE DRAWINGS

The above and other objects, features and advantages of the invention will become apparent from a consideration of the following detailed description presented in connection with the accompanying drawings in which:

FIG. 1b is a side elevation view of the alignment device of FIG. 1a;

FIG. 1c is a cross-section view o the alignment device taken along line I of FIG. 1a;

FIG. 1d is a cross-section view of the alignment device taken along line II of FIG. 1a;

FIG. 2b is a side elevation view of the alignment device of FIG. 2a;

FIG. 2c is a cross-section view taken along line III of FIG. 2a;

FIG. 2d is a cross-section view of the alignment device taken along line IV of FIG. 2a;

FIG. 3b is a side elevation view of the alignment device of FIG. 3a;

FIG. 3c is a cross-sectional view of the alignment device taken along line V of FIG. 3a;

FIG. 3d is a cross-sectional view taken along line VI of FIG. 3a;

DETAILED DESCRIPTION

Figure 1A:
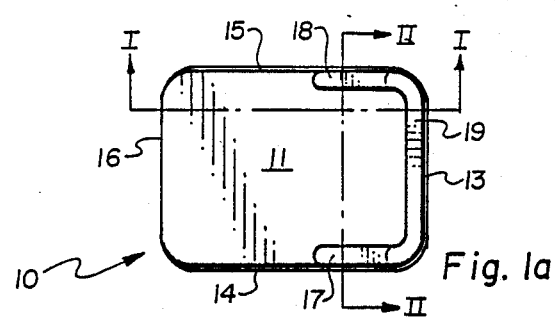
FIG. 1a is a plan view of the aligning and support device of the present invention.
Figure 2A:
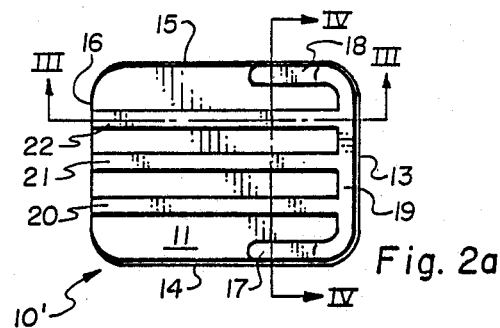
FIG. 2a is a plan view of an alignment and support device in accordance with another embodiment of the present invention.
Figure 1B:
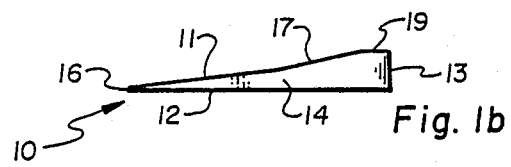
Figure 2B:
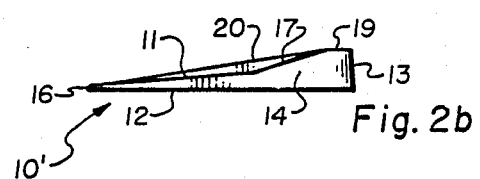
Figure 1C:
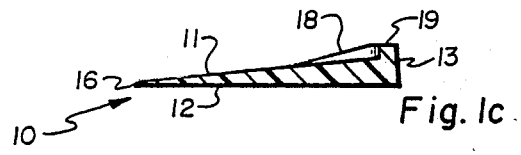
Figure 2C:
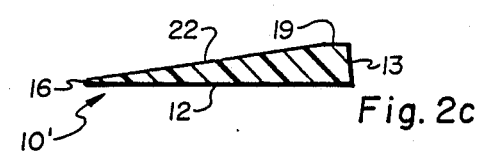
Figure 1D:
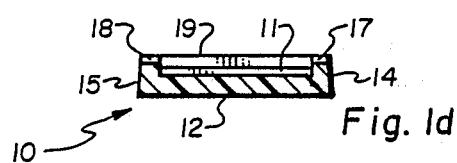
Figure 2D:
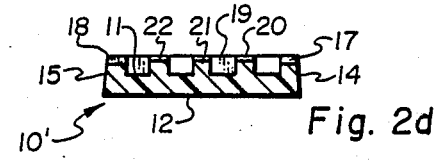
Figure 3A:
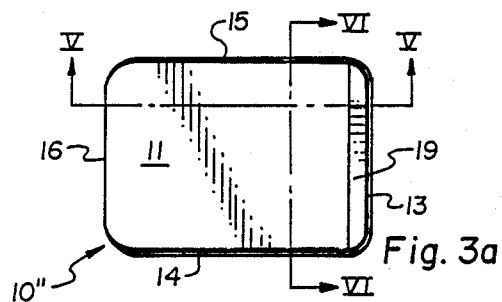
FIG. 3a is a plan view of an alignment and support device in accordance with another embodiment of the present invention.
Figure 3C:
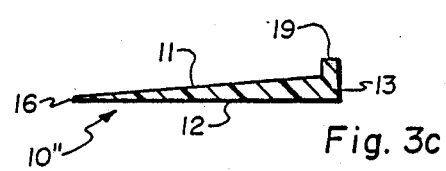
Figure 3B:
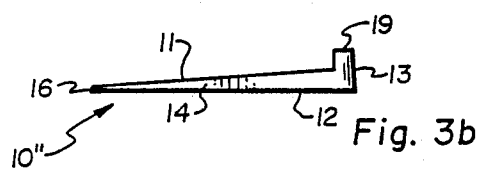
Figure 3D:
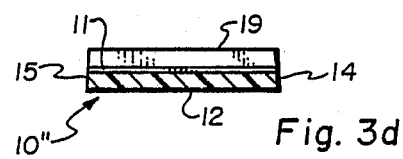

Referring to the drawings in which similar elements are indicated with similar numbers in each of the figures, there is shown in FIGS. 1a–d, an alignment and support device 10 having a rectangular top surface 11 and a rectangular bottom surface 12. The top surface 11 being located in a plane which is at an angle to the plane of the surface 12 so as to form a wedge-shaped member. The front edge 16 being of a uniform thickness along its entire length and the rear edge 13 also being of a uniform thickness along its entire length. The thickness of rear edge 13 being substantially greater than the thickness of front edge 16. Side edges 14 and 15 increase nonuniformly in height from the front edge 16 to the rear edge 13.

The U-shaped reinforcement ridge 19 protrudes above top surface 11 and is coextensive with the rear edge 13. The reinforcement ridge 19 may also comprise arm portions 17 and 18 which are coextensive with a portion of the length of side edges 14 and 15 and taper in the direction of the front edge 16 until their surfaces contact the surface 11. As can be seen, front edge 16 and rear edge 13, along with side edges 14 and 15, can advantageously be formed with a slight inward taper from bottom surface 12 to top surface 11.

FIGS. 2a–d show a second embodiment 10' of the invention which includes ridge elements 20, 21 and 22 which extend from front edge 16 along the length of surface 11 to meet and become integral with reinforcement ridge 19. Ridge elements 20, 21 and 22 are tapered such that they are equal to the thickness of support ridge 19 at their junction therewith, and uniformly decrease in thickness until, at their conjunction with front edge 16, they are flush with the top surface 11.

FIGS. 3a–d show another embodiment 10" of the present invention which are similar to the embodiment shown in FIGS. 1a–d except that the arms 17 and 18 of the enforcement ridge 19 are no longer present. Device 10" is primarily intended for use on smaller tiles which allow it to be smaller in dimension and which require a less rigid structure for alignment and support purposes.

Figure 4:
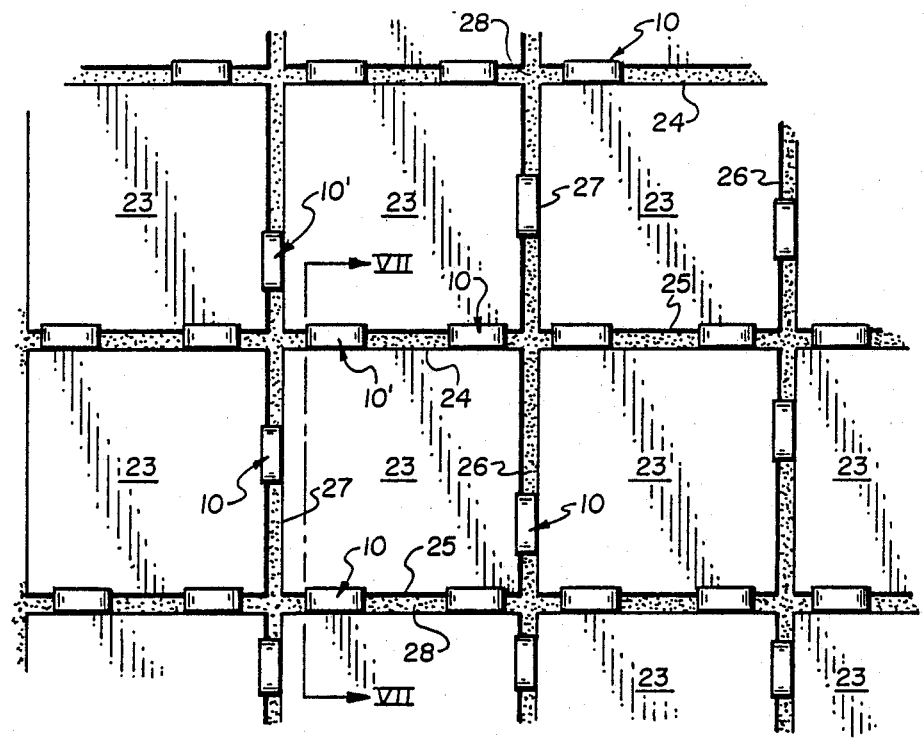
FIG. 4 is a plan view of a surface covered with tiles which are aligned and supported by alignment devices in accordance with the principles of the present invention.

FIG. 4 shows a group of tiles being oriented on a surface by the alignment devices of the present invention. As can be seen, tiles 23 are placed against the surface which has previously been covered with a mortar or other semifluid adhesive 28. The tile edge 24, 25, 26 and 27 are contacted by the alignment device 10 and held in a spaced-apart relationship from the edges of adjacent tiles.

Figure 5:
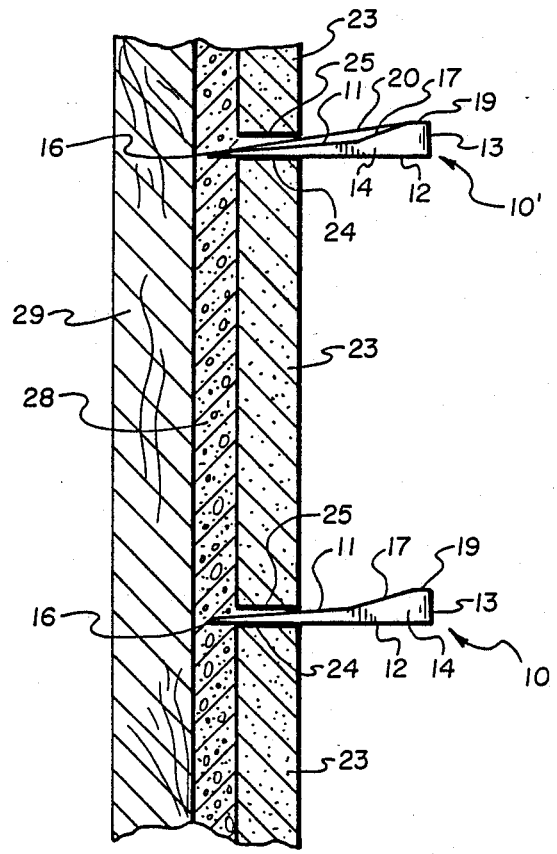
FIG. 5 is a cross-sectional view of the surface taken along line VII of FIG. 4.

As can best be seen in FIG. 5, alignment device 10 maintains a spaced-apart relationship between edge 24 and edge 25 while the adhesive 28 adheres sufficiently to prevent movement of tile 23. The alignment device 10 can be inserted either a short distance to form a narrow space between the surfaces 24 and 25, or may be inserted further to increase the spacing between the edges. Alignment device 10', because of ridge elements 20, 21 and 22, forms a larger space between edges 24 and 25 than does the alignment device 10. Alignment device 10' may also be used to adjust the size of the space between edges 24 and 25 by varying the distance it is pushed into the space.

When it is desired to remove the alignment device 10 from its location between the tiles, the user can securely grip the bottom surface 12 and top surface 11. Because of the combined weight of the tiles 23 which may have been placed above in alignment device 10 and because the front edge 16 of the alignment device may be in contact with adhesive 28, it can require a large amount of force to pull the device 10 from the space, once the adhesive has cured. Reinforcement ridge 19, therefore, significantly aids the user in removing the device 10 by providing the user a more secure grip. For example, the user can grip the bottom surface 12 with a finger or fingers, and top surface 11 with a thumb. The thumb is prevented from slipping from the device 10 because of the increased friction and/or grippability created by the reinforcement ridge 19.

The device 10 may be formed of any material which is sufficiently rigid to align and support the tiles, preferably plastic, metal or wood. Examples of plastic materials which would be suitable for use are polypropylene and/or nylon. The device may also be made of an overall size which is sufficient to support and space the type and size of tile being used. For example, the device 10 may be formed of a length (from front edge 16 to rear edge 13) of approximately 1¾ inches and width (from edge 14 to edge 15) of approximately 1¼ inches, and may have a thickness at rear edge 13 (including the reinforcement ridge 19) of approximately 174 inch. The device 10 may be formed of somewhat smaller dimensions when intended to be used on relatively small tiles, or may be formed with somewhat larger dimensions when included for relatively large, heavy tiles and/or marble slabs. Also, the device 10' may have any number of ridge elements (shown as elements 20, 21 and 22) depending on the strength and rigidity required for its intended use. The thickness of the device 10 being dictated by the spacing requirements of the tiles.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. An alignment and support device for tiles comprising
   a generally wedge-shaped member having a top surface, a bottom surface, a front edge, and a rear edge, said rear edge being thicker than said front edge, and
   a reinforcement means located adjacent said rear edge and protruding above said top surface,
   whereby said reinforcement means and the portions of said top and bottom surfaces adjacent said reinforcement means constitute gripping surfaces for a user's hand.

2. An alignment and support device according to claim 1 wherein said reinforcement means comprises a U-shaped member having a bail portion which constitutes part of said rear edge, and arm portions, said arm portions being located on said top surface and being tapered in the direction of said front edge.

3. An alignment and support device according to claim 2 further comprising a plurality of ridge members located on said top surface, each of said ridge members tapering from said bail portion to said front edge.

* * * * *